United States Patent
Linkies

(10) Patent No.: US 9,333,699 B2
(45) Date of Patent: May 10, 2016

(54) DEVICE AND METHOD FOR LONGITUDINALLY STRETCHING A FILM WEB

(75) Inventor: Juergen Linkies, Lienen (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 860 days.

(21) Appl. No.: 13/509,090

(22) PCT Filed: Nov. 2, 2010

(86) PCT No.: PCT/EP2010/066646
§ 371 (c)(1),
(2), (4) Date: Aug. 1, 2012

(87) PCT Pub. No.: WO2011/057918
PCT Pub. Date: May 19, 2011

(65) Prior Publication Data
US 2012/0292818 A1 Nov. 22, 2012

(30) Foreign Application Priority Data
Nov. 10, 2009 (DE) .................. 10 2009 046 585

(51) Int. Cl.
*B29C 55/26* (2006.01)
*B29C 55/06* (2006.01)

(52) U.S. Cl.
CPC ..................... *B29C 55/065* (2013.01)

(58) Field of Classification Search
CPC ........................................... B29C 55/065
USPC ............. 425/335, 336, 363, 367, 404, 461; 264/210.7, 235.8, 288.4, 291
See application file for complete search history.

(56) References Cited

U.S. PATENT DOCUMENTS

| 4,017,251 | A | * | 4/1977 | Coburn et al. ............... 425/404 |
| 4,310,485 | A |   | 1/1982 | Dauber |
| 4,436,888 | A |   | 3/1984 | Copple |
| 4,683,093 | A | * | 7/1987 | Hagiwara et al. ...... 425/174.8 E |
| 6,375,781 | B1 | * | 4/2002 | Wojcik et al. ............... 156/229 |
| 2008/0023866 | A1 |   | 1/2008 | Oedl |

FOREIGN PATENT DOCUMENTS

| DE | 36 21 205 | 1/1988 |
| JP | 62147519 | 7/1987 |
| JP | 1-237118 | 9/1989 |
| WO | WO 2006/063641 | 6/2006 |

* cited by examiner

*Primary Examiner* — Joseph S Del Sole
*Assistant Examiner* — Thukhanh T Nguyen
(74) *Attorney, Agent, or Firm* — Jacobson Holman, PLLC

(57) ABSTRACT

An apparatus for the longitudinal stretching of a film web includes at least one heater in which the film web can be heated, at least one cooling device in which the film web can be cooled, and at least a stretching unit in which the film web is stretched in its longitudinal direction. The stretching unit has a first transport roller having a first peripheral speed in the stretching operation, followed by a second transport roller having a second peripheral speed along the transport path of the film web from the first transport roller, with the second peripheral speed being greater than the first transport roller speed. The apparatus includes a pressing device with which the film web is pressed against the first transport roller along a line which is in the area of the release line of the film web from the first transport roller.

6 Claims, 2 Drawing Sheets

DEVICE AND METHOD FOR LONGITUDINALLY STRETCHING A FILM WEB

CROSS-REFERENCE TO RELATED APPLICATIONS

This is a national stage of PCT/EP10/066646 filed Nov. 2, 2010 and published in German, which claims the priority of German number 10 2009 046 585.5 filed Nov. 10, 2009, hereby incorporated by reference.

BACKGROUND OF THE INVENTION

1. Field of Invention

The invention relates to an apparatus for the longitudinal stretching of a film web and a corresponding method.

The properties of thermoplastic films can be changed intentionally through their stretching. Such properties include, for example, the transparency or the strength. Such stretching can occur in both the lateral and/or longitudinal directions of the film web and can be effected directly in-line after the extrusion process. However, the extruded film may also be initially rolled up and the apparatus for the longitudinal stretching can be used after reprocessing ("offline processing").

2. Description of the Prior Art

FIG. 1 of the document WO 2006/063641 A1 shows a multi-stage apparatus for the longitudinal stretching of a film web. The features of such an apparatus include:
   at least one heater in which the film web can be heated,
   at least one cooling device in which the film web can again be cooled down, and
   at least one stretching apparatus in which the film web is stretchable in its longitudinal direction,
whereby the stretching apparatus has a first transport roller running at a first peripheral speed in the stretching operation and, looking along the transport path of the film web and following the first transport roller, a second transport roller having a second peripheral speed, whereby the second peripheral speed is higher than the first peripheral speed.

In general, such an apparatus also has annealing or tempering rollers that are positioned between the stretching apparatus and the cooling rollers. These latter rollers often already have a lower temperature than the heating rollers, but are so tempered that they avoid too rapid a cooling of the web. The difference between the cooling rollers and annealing rollers is often achieved by hot oil flowing through the annealing rollers and water flowing through the cooling rollers.

It is a fact that most of the actual stretching process occurs between the actual stretching rollers.

The longitudinal stretching, i.e. a stretching of the film web in its transport direction, takes place as a result of the higher peripheral speed of the second transport roller compared to the peripheral speed of the first transport roller. Simultaneously, the thickness of the film web decreases. However, in the heating device, the film web is first heated. After it has been stretched, the film web passes through the cooling device to again cool the film web to a temperature well below the plasticizing temperature. Film webs used with such an apparatus for longitudinal stretching are preferably processed from thermoplastic materials such as polystyrene, polypropylene or polyethylene.

The actual stretching process takes place between the two transport rollers, whereby this process begins immediately after releasing the film from the first transport roller.

It has been determined from thickness measurements of film webs, however, that thicknesses vary greatly in the lateral direction. This means that, looking in the lateral direction, the film web is stretched to different degrees. Films with varying thicknesses in the lateral direction, however, are often not desired.

SUMMARY OF THE INVENTION

The object of the present invention is, therefore, to propose an apparatus and a method for the production of film webs having fewer thickness variations.

The object is achieved by an apparatus as described herein.

Accordingly, there is a pressing device by means of which the film web is pressed against the first transport roller in a production line in the area of the release edge of the film web from the first transport roller. In addition to this, or instead of it, a pressing device is provided with which the film web can be pressed against the second transport roller in a production line in the area of the input edge of the film web to the second transport roller.

The invention is based on the following attempt to explain the thickness variations: as the stretching described above begins directly after releasing the film web from the first transport roller, this can only mean that the web film is not released along a line that is expected in theory. Viewed over the width of the film, it is thus released at different circumferential angular positions. The same can occur when inputting the film in the second transport roller. Here, the film web, as seen over its width, is input in the second transport roller at different circumferential angles.

By means of the pressing device, one now releases the film web along a line that is lateral to its direction of transport from the first transport roller. This results in the stretching being more uniform across the width of the film web, so that the thickness of the film web has fewer variations in thickness. The pressing device associated with the second transport roller presses the film web along a line that is lateral to the direction of transport to the second transport roller, thus leading to a further homogeneity of the stretching.

The term "in the area of" means that the pressing device acts exactly along the lines of release and/or input, but that technical tolerances are to be taken into account. This can lead to the pressing device at the first transport roller being slightly displaced in the transport direction of the film web. The pressing device at the second transport roller would then be correspondingly displaced in the opposite direction to the transport direction. The displacement from the release line is in the range of −1 to +5 degrees in the rotational direction of the first transport roller. In the rotational direction of the second transport roller, this area may be correspondingly from −5 to +1 degrees from the input line.

The following explanations of exemplary embodiments and advantageous embodiments usually refer to the pressing device associated with the first transport roller. However, the explanations are equally applicable to the pressing device associated with the second transport roller.

In an advantageous development of the invention, it is so arranged that the pressing device presses the film web along a line that represents the line of contact of a tangential plane to the first transport roller, whereby said tangential plane is the common tangential plane to the first and the second transport rollers. This tangential plane represents the tangential plane along which the film web is essentially led from the first to the second transport roller. The contact lines of the tangential planes represent the optimal release point from the first transport roller and the optimal input point to the second transport roller.

It is advantageous if the pressing device is adjustable in the radial direction of the first transport roller and/or in its circumferential direction by means of a first and a second adjusting device. The position of the release line can be affected in this way.

In an advantageous embodiment of the invention, it is so arranged that the pressing device comprises a pressure roller. A relatively high pressure can be applied with such a pressure roller.

Furthermore, it is advantageous if at least areas of the peripheral surface of the pressure roller are coated with an elastomer. Various elastomeric materials are conceivable here. One example is rubber.

BRIEF DESCRIPTION OF THE DRAWINGS

Further embodiments of the invention are apparent from the description and the claims.

The individual figures show.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
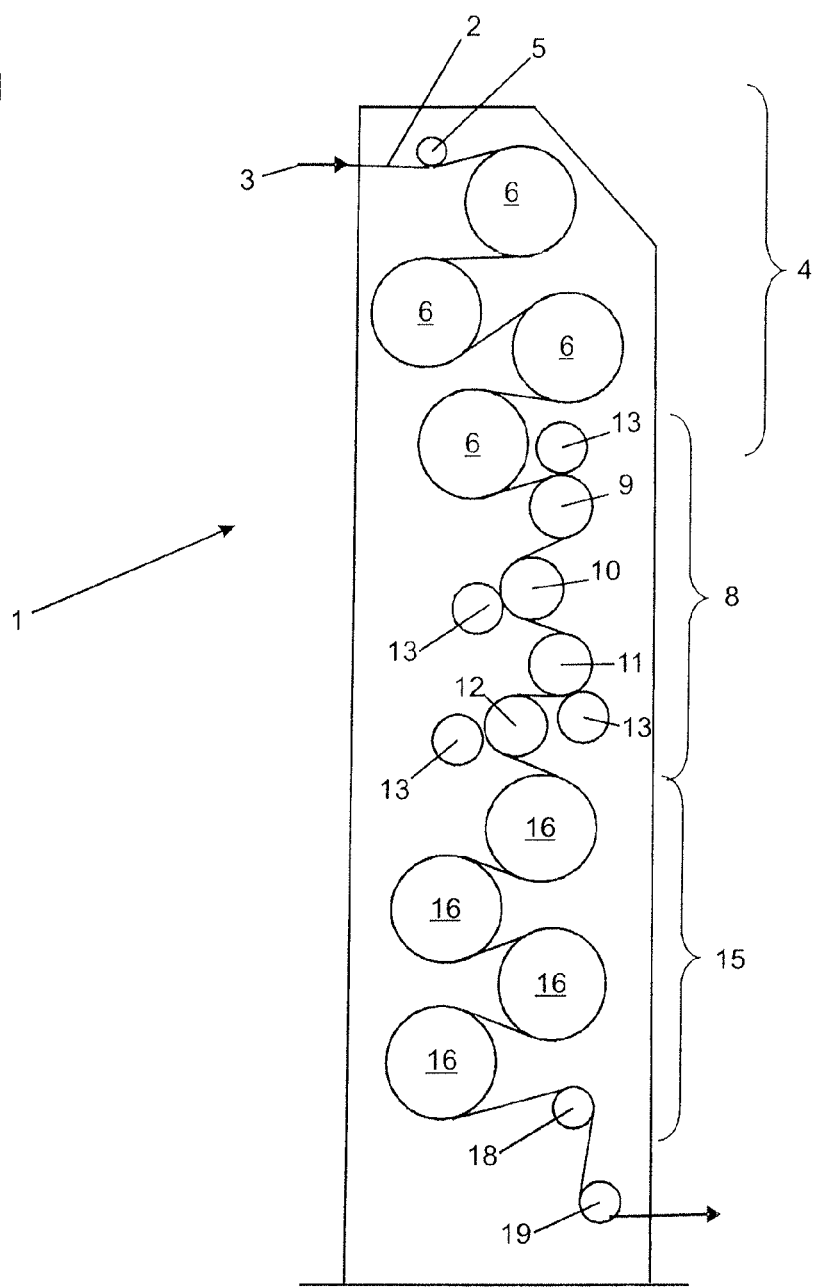
FIG. 1 An apparatus for the longitudinal stretching of a film web according to the prior art FIG. 2 View of a first transport roller with a stretching operation and the typical release edge according to the prior art FIG. 3 View of a section of a device according to an embodiment of the invention.

FIG. 1 shows a device 1 for the longitudinal stretching of a film web 2, which is guided along a transport path in the transport direction 3. The film web 2 is fed from an extrusion device or an unwinding device. First, the film web passes through a guide roller 5 before passing through the heating device 4 comprising four consecutive heating rollers 6 that are temperature-controlled.

After the film web 2 is heated in this way to, or above, the plastification temperature, it is introduced into the stretching unit 8. The stretching unit 8 comprises transport rollers 9, 10, 11, 12, whereby the said roller pairs 9 and 10 and the roller pairs 11 and 12 each form a so-called stretching gap. The rollers 10 and 12 have in each case a higher peripheral speed than their associated rollers 9 and 11. The rollers 10 and 11 can, however, have the same peripheral speed. Each of the four said transport rollers is associated with a pressure roller 13, each of which ensures that the film web 2 is pressed firmly against the transport rollers and cannot slip.

In the cooling device 15, the film web 2 is guided over the cooling rollers 16. In the cooling device 15, further rollers, known as annealing rollers, may be provided as already described above but which are not shown here.

After the film web 2 passes two more guide rollers 18 and 19, it can be fed to a winding device or any further processing device.

Figure 2:
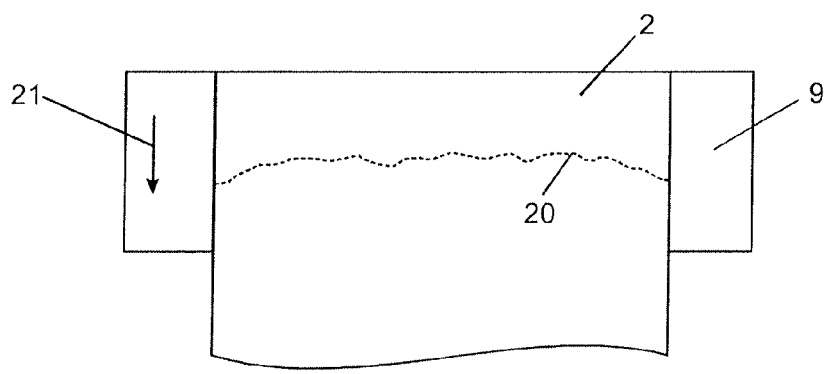

FIG. 2 illustrates the release edge 20, which occurs in practice when the film web 2 leaves the transport roller 9. The direction of rotation of the roller 9 is indicated by the arrow 21. The film web 2 is not released from the roller 9, as might generally be expected, along a straight line which is parallel to the axis of rotation of the roller 9 (nominal release line). Rather, the release edge 20 has an irregular release. A tendency of the film web to release at the edges a little later than in the middle of the roller 9 can be determined. In the areas in which the film web 2 releases prematurely, there is stronger stretching and a reduced thickness of the film web can be seen.

Figure 3:
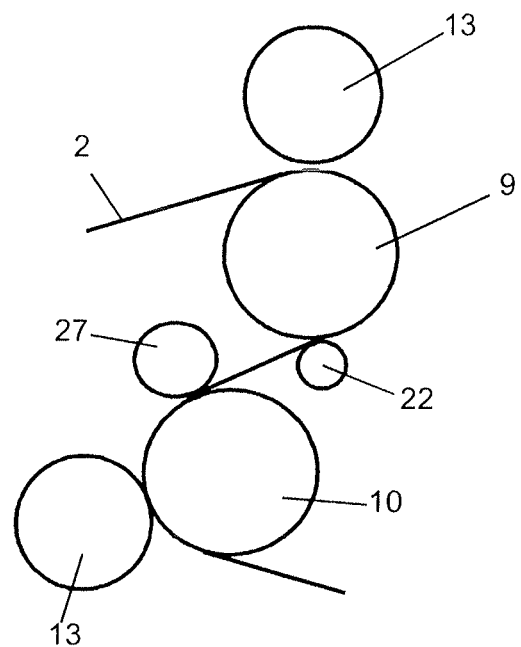

In order to remedy the problem and according to FIG. 3, a pressing device in the form of a pressure roller 22 is provided that holds the film web 2 to the nominal release line on the circumference of the transport roller 9. The nominal release line is the contact point of the common tangential plane of the rollers 9 and 10 with the roller 9. The pressure roller 27 serves the same purpose by being arranged at the second transport roller 10 at the line at which the said common tangential plane contacts the transport roller 10. This ensures that the film web 2 lies along this line over its entire width at the transport roller 10. By providing the pressure roller 27, the stretching process is stopped over the whole film width.

Figure 4:
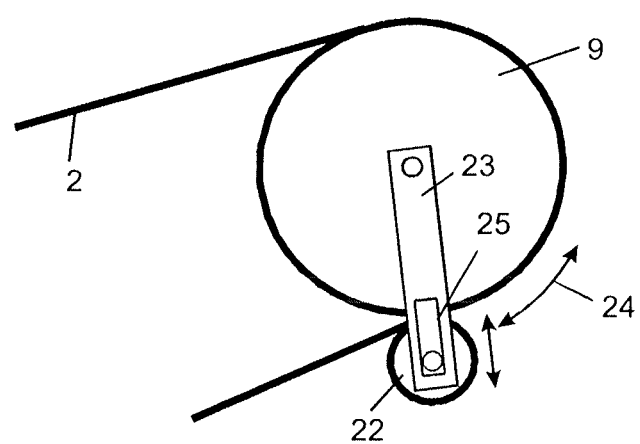
FIG. 4 Adjusting means for adjusting a pressure roller in a device according to the invention

FIG. 4 shows another embodiment of the invention. The pressing roller 22 is mounted on a pivoting arm 23 so that the roller pivots along the arrow 24 in the circumferential direction of the roller 9. Instead of a swivel arm, a suitably shaped guide slot in a part of the machine frame may be conceivable. Other embodiments of a pivot device are known to the person skilled in the art who can use them as needed. A pivoting device is necessary if the relative positions of the rollers 9 and 10 change with respect to one another, so that the point of contact of the tangential plane changes.

The pivot arm 23 is provided with a guide 25 along which the roller 22 can be moved in the radial direction of the roller 9 (indicated by the double arrow 26) in order to be able to apply different contact pressures to the film web 2. Again, more adjusting devices are also conceivable, in particular those which function independently of the pivoting arm.

Experiments have shown that in a device according to the invention, the thickness of the film web over its width is more uniform than in devices according to the prior art. For this reason the overall quality of the film is increased.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

LIST OF REFERENCE NUMERALS

1 Device for the longitudinal stretching of a film web 2
2 Film web
3 Transport direction
4 Heating
5 Guide roller
6 Heating roller
7
8 Stretching unit
9 Transport roller
10 Transport roller
11 Transport roller 12 Transport roller
13 Pressure roller
14
15 Cooling device
16 Cooling roller
17
18 Guide roller
19 Guide roller
20 Release edge
21 Rotary direction of the roller 9
22 Pressing roller
23 Pivot arm
24 Pivoting direction
25 Guide
26 Radial movement direction
27 Pressing roller

What is claimed is:

1. An apparatus for the longitudinal stretching of a film web, comprising:
   a heater in which the film web can be heated;
   a cooling device in which the heated film web is cooled;
   a stretching unit disposed between the heater and the cooling device in a transport path of the film web, in which the film web is stretchable in a longitudinal direction thereof, the stretching unit including a first transport roller which runs at a first peripheral speed during stretching, and, along the transport path of the film web from the first transport roller, a second transport roller having a second peripheral speed that is higher than the first peripheral speed; and
   at least one of a first pressing device with which the film web is pressed against the first transport roller along a line which is in an area of a release line of the film web from the first transport roller, and a second pressing device with which the film web is pressed against the second transport roller along a line which is in area of an input line of the film web to the second transport roller.

2. The apparatus according to claim 1,
   further comprising
   a first adjusting device that enables the at least one of the first pressing device and the second pressing device to be adjustable in a radial direction of a respective one of the first transport roller and the second transport roller.

3. The apparatus according to claim 1,
   further comprising
   a second adjusting device that enables the at least one of the first pressing device and the second pressing device to be adjustable in a circumferential direction of a respective one of the first transport roller and the second transport roller.

4. The apparatus according to claim 1,
   wherein
   the at least one of the first pressing device and the second pressing device is a pressure roller.

5. The apparatus according to claim 4,
   wherein
   at least areas of a peripheral surface of the pressure roller are coated with an elastomer.

6. A method of longitudinal stretching a film web, comprising:
   heating the film web in a heater;
   cooling the film web in a cooling device;
   stretching the film web in a longitudinal direction thereof in a stretching unit disposed between the heater and the cooling device in a transport path of the film web, the stretching unit including a first transport roller having a first peripheral speed during the stretching, followed by a second transport roller along the transport path of the film web from the first transport roller, the second transport roller having a second peripheral speed that is higher than the first transport roller speed; and
   with at least one of a first pressing device with which the film web is pressed against the first transport roller along a line which is in an area of a release line of the film web from the first transport roller, and a second pressing device with which the film web is pressed against the second transport roller along a line which is in the area of an input line of the film web to the second transport roller, pressing the film web,
   with an area of −1 to +5 degrees from the release line and from −5 to +1 degrees from the input line lying in a rotational direction of the transport rollers, and
   the at least one of the first pressing device and the second pressing device pressing the film web along a line that represents the line of contact of a tangential plane to the first transport roller or the second transport roller, and with said tangential plane being a common tangential plane of the first transport roller and the second transport roller.

* * * * *